Jan. 20, 1970 N. J. HARRICK 3,491,366
VARIABLE ANGLE ATTACHMENT FOR INFRARED REFLECTION SPECTROSCOPY
Filed June 30, 1965 2 Sheets-Sheet 1
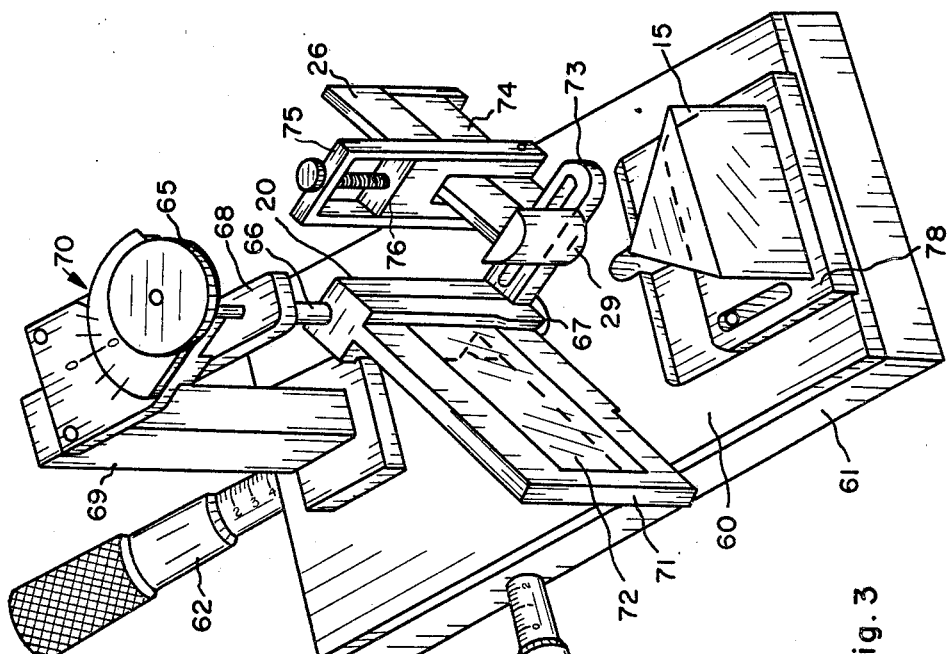
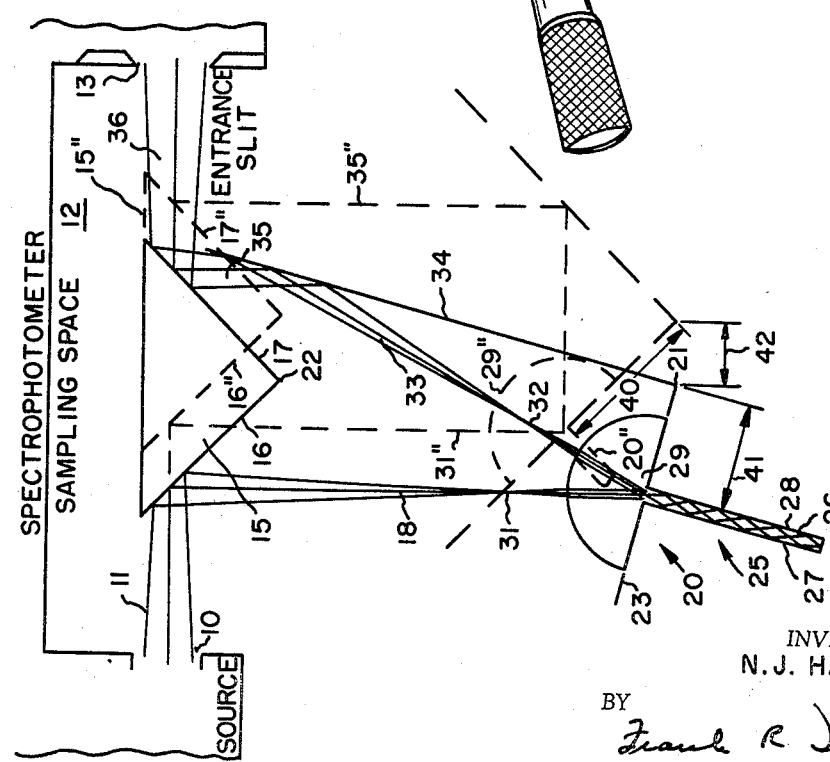
INVENTOR.
N. J. HARRICK
BY
Frank R. Trifari
AGENT

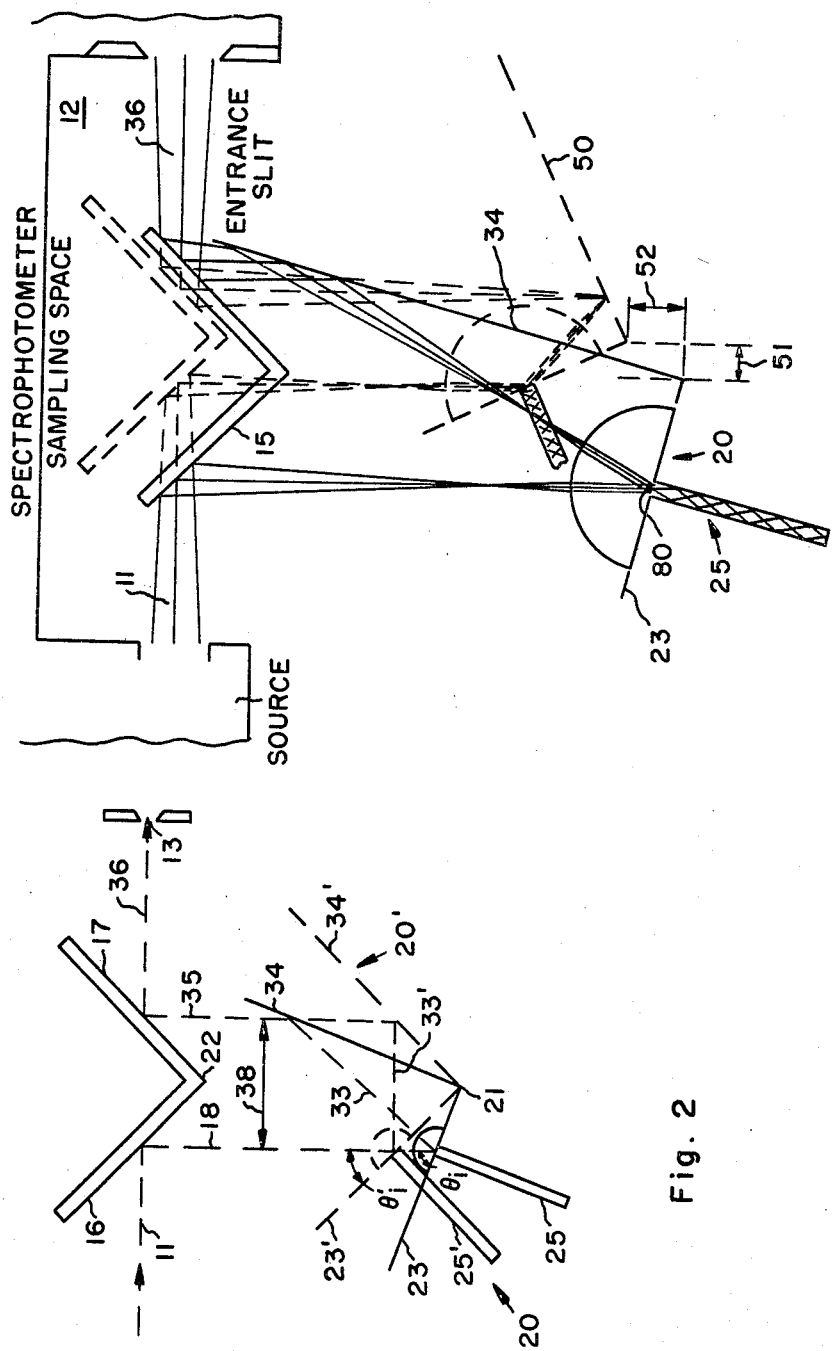

United States Patent Office 3,491,366
Patented Jan. 20, 1970

3,491,366
VARIABLE ANGLE ATTACHMENT FOR INFRA-RED REFLECTION SPECTROSCOPY
Nicolas J. Harrick, Ossining, N.Y., assignor, by mesne assignments, to U.S. Philips Corporation, New York, N.Y., a corporation of Delaware
Filed June 30, 1965, Ser. No. 468,283
Int. Cl. G01n 21/00; G01j 3/00, 3/10
U.S. Cl. 356—98                                     4 Claims

ABSTRACT OF THE DISCLOSURE

A variable angle attenuated total reflection attachment for use in the sample area of a spectrophotometer comprising a 90° prism and a retrodirector. The retrodirector comprises a support for a double-pass multiple total internal reflection cell and a plane reflecting surface extending in a plane at right angles to the plane of the support. Radiation incident on one of the faces of the prism forming the 90° angle is directed to a reflection cell mounted on the support. Radiation exiting from the cell is reflected by the reflecting surface onto the other face of the prism forming the 90° angle for reflection thereby. The retrodirector is rotatable about an axis formed by the intersection of the plane of the support with the plane of the reflecting surface for varying the angle of incidence of radiation on a sampling surface contained on said cell.

---

This invention relates to an improved variable angle attachment for internal reflection spectroscopy.

Internal reflection spectroscopy has found wide use in, among other areas, the analysis of substances by its infrared absorption spectrum. The technique and many of its recent developments are described in detail in my paper published January 1964 in vol. 36, No. 1, pages 188–191 of "Analytical Chemistry," the contents of which are hereby incorporated by reference. As is well known, in the infrared analysis application, the radiation is directed through a cell or light pipe at such an angle as to impinge on a sampling surface at an angle exceeding the critical angle, such that total reflection occurs except as frustrated by the presence of an absorbing substance on the sampling surface. The angle of incidence chosen determines the depth of penetration of the radiation into the substance at the interface, and varying the angle of incidence enables the substance to be analyzed at a chosen depth. In addition, for a multiple reflection cell of given length, variation of the angle of incidence enables the operator to control the number of reflections that occurs, which also controls the amount of absorption that the beam undergoes in interacting with the unknown substance being analyzed.

Efforts have been directed toward adapting this technique for use with conventional infrared spectrometers, and one of the difficulties encountered is the limited amount of space provided for insertion of the cell in the usual instrument. To overcome this limitation, external optics have been included to bring the beam outside of its normal path for passage through the cell outside of this limited sampling space, and then to return the beam to the instrument. It will be clear that a mechanism which provides for varying the angle of incidence of the beam on the cell surface will tend to deviate the beam from its desired path. In addition, any change in the length of the path of the beam may alter the focus conditions present in the optics. Thus, there is a need in the art for a device which would permit the angle of incidence of the beam through the cell to be varied and at the same time enable the beam to be returned to its proper path without a significant loss in the focussing, or at least with a loss which is easily correctable.

One solution proposed in the art is to employ a right-angle mirror for deflecting the beam out of the sampling space and directing it onto a right-angle prism. The cell with the sample to be analyzed is coupled to a short face of the prism. By rotating the mirror, it is possible to vary the angle of incidence. With a sufficiently well collimated beam, only minor defocussing of the source image at the entrance slit of the spectrometer is encountered. However, the beam is displaced, and it becomes necessary to displace the mirror or the prism laterally relative to the other to return the beam to the desired spectrometer path.

I have invented an improvement of the above-described device, which improvement eliminates several of its shortcomings and which improvement I find simpler to operate and of greater versatility, especially in its adaptation for use with a focussed beam rather than a collimated beam. In my invention, I also use a right-angle mirror for displacing the beam from the sampling space of the spectrometer. In place of the prism, I use a retrodirector and I mount the cell as part of the first reflecting surface of the retrodirector. In my device, the spacing between the right-angle mirror and the retrodirector remains fixed and not adjustable as in the earlier-suggested device, and I vary the angle of incidence not by rotating the right-angle mirror, but by rotating the retrodirector. My improved device thus makes full use of the peculiar optical properties associated with a retrodirector, namely, that, independent of the orientation thereof, the emergent beam is always parallel to the incident beam, the spacing between the beams remains fixed, and thus the length of the path that the beam follows remains fixed. As a consequence, employing a collimated beam, there is no displacement of the emergent beam no matter what angle of incidence is chosen, and no adjustment in the system other than locating the cell to receive the beam is necessary. With a focussed beam, where use of a double-pass, multiple reflecting cell is desired, it will be appreciated that an adjustment is necessary to maintain the focussing of the beam at the entrance of the double-pass cell. But I have found that the adjustments necessary to maintain the focussing are very small for extremely wide ranges of variation of the incident angle and that only a small displacement of the entire assembly will return the beam to the desired optical path.

My invention will now be described in greater detail with reference to several illustrative embodiments thereof, reference being had to the accompanying drawing, in which:

FIG. 1 is a schematic view of the optics of one form of variable angle attachment in accordance with the invention;

FIG. 2 is a simplified view of the optics of FIG. 1;

FIG. 3 is a perspective view of a device according to my invention utilizing the optics of FIG. 1;

FIG. 4 is a schematic view of the optics of another form of variable angle attachment in accordance with the invention.

Referring now to FIG. 1 of the drawing, there is shown therein, in schematic form, the sampling space in a conventional infrared spectrophotometer. As is well known, such devices provide a source of infrared radiation which is conveyed through a cell containing the material to be analyzed. The existing beam whose intensity as a function of wavelength has been modulated by the absorption characteristics of the sample reenters the spectrometer at an entrance slit, and from there is passed through a monochromator which analyzes the beam by its wavelengths and the analyzed beam is directed to an infrared radiation detector, usually a thermocouple, the output of which is in turn coupled to a strip chart or X–Y recorder. The latter is in turn coupled to the beam analyzer. Thus, the strip chart recorder plots a curve of beam intensity versus wavelength of the infrared radiation, producing the conventional and well-known infrared absorption spectra. In the drawing, the beam source is shown schematically emerging from an aperture 10 as a focussed beam of radiation 11. The opposite end of the sampling space for the cell, which sampling space is referred to by reference numeral 12, is provided with an entrance slit 13 for the returning beam. The monochromator, detector, and recorder are not shown as they are well known conventional elements. The invention is concerned with providing a device which can conveniently be associated with the sampling space 12 for receiving and passing the focussed beam through an internal reflection cell and returning the beam to its original path so that it will properly reenter the entrance slit of the spectrometer, and also to provide for varying the angle of incidence of the beam on the sampling surface of the cell.

In my invention, I provide a right-angle, silvered prism 15 possessing one reflecting surface 16 which functions to deflect the beam out of the sampling space, and possessing a second reflecting surface 17 extending at right angles to the first reflecting surface 16, which functions to redirect the returning beam into the entrance slit 13 of the spectrometer. The focussed beam deflected off the first deflecting surface 16, which beam is referred to by reference numeral 18, is intersected by what is basically a 2-dimensional corner reflector optical device or retrodirector 20. This retrodirector 20 is pivotable or rotatable about an axis 21, whose location is fixed relative to the axis 22 passing through the intersection of the reflecting surfaces 16 and 17 of the prism 15. The retrodirector 20 has a receiving area or first surface 23 on which is mounted an internal reflection cell 25. In the form shown, the cell is a double-pass cell of the type illustrated in FIG. 3d of my above-mentioned publication in "Analytical Chemistry," and comprises a thin, infrared, transparent plate 26, on one or both of its major surfaces 27, 28 is provided the sample to be analyzed, provided at its combined entrance and exiting end with an infrared transparent hemi-cylinder 29 which allows the beam to enter the cell 25 at various angles. As will be noted, the beam 18 is focussed at a point 31 just before impinging on the hemi-cylinder 29, with the result that the beam is effectively collimated in its passage through the hemi-cylinder and through the double-pass cell 25, and after emerging from the hemi-cylinder 29 refocusses to a point at 32. This beam, referred to by reference numeral 33, then impinges on a second reflecting surface 34 of the retrodirector 20. As will be observed, the resultant optical paths are the same as would result if the cell 25 were replaced by a plane mirror extending along the plane 23 at right angles to the reflecting surface 34. The beam 33 now reflects off of the second reflecting surface 34 to form a beam 35 which then reflects off of the second reflecting surface 17 of the prism 15 to form a beam 36 directed into the entrance slit 13 of the instrument.

The angle of incidence of the beam on the sampling surfaces 27 and 28 of the cell 25 is varied by rotating the retrodirector 20 around its pivot or axis 21. The effect of this is illustrated in FIG. 2, which is a simplified view of the optics of the device illustrated in FIG. 1 employing, for illustrative purposes, a non-focussed beam, the same reference numerals being employed in connection with the same elements. The position of the retrodirector 20, corresponding to the position shown in FIG. 1, is shown in solid lines. In dashed lines is shown the change that occurs in the beam path when the retrodirector is rotated to a new position 20′, and the cell 25 moved to a new position 25′. As will be observed, the beam 18 now impinges at an angle $\theta_1'$ which is smaller than the angle $\theta_1$ at which the beam impinges on the sampling surfaces of the cell in the position shown in solid lines. The existing beam now has a new path 33′ compared with the path 33 it had with the retrodirector in the original position. It will further be noted, however, that the beam which deflects off of the second reflecting surfaces 34′ ultimately coincides with the beam position taken with the reflector in the original position, and thus the beam 36 entering the spectrometer slit 13 is undeviated. What is inherent in the geometry chosen is that the beams 18 and 35 remain parallel and spaced a distance 38 apart that is fixed, independent of the orientation of the retrodirector 20, so long as the spacing between the axes 21 and 22 remains fixed. Further, the optical path length remains unchanged. Hence, with a collimated beam, rotation of the retrodirector 20 will enable the angle of incidence of the beam on the internal reflection cell to be varied without displacing the emerging beam and without requiring any adjustment whatever in the system. Thus, the device illustrated by the optics in FIG. 2 can be employed with a collimated beam with single or multiple internal reflection cells which exhibit no refraction at the entrance and exit surfaces. However, with multiple reflection cells of the type illustrated in FIG. 1, in which a focussed beam is desirable in the sampling space, then an adjustment is necessary to correct for the displacement of the cell when the retrodirector is rotated relative to the focal point 31 (of course, additional focussing optics are required to refocus the beam at the entrance slit of the monochromator). This displacement can be corrected, very simply, in one of two ways.

FIG. 1 illustrates one embodiment in which the cell 25 is translated along the receiving surface 23 of the retrodirector 20, and then the entire assembly is translated horizontally to relocate the cell at the proper place relative to the focal point 31. The new location is illustrated in dashed lines in FIG. 1. As will be noted, the cell 25 has been displaced outwardly from the axis 21 a distance 40 which exceeds the distance 41 by which the cell was spaced from the axis in the original position. The whole assembly is now displaced to the right a distance 42. This action now shifts the focal point 31″ upward a distance equal to the distance 42 so that the beam is now properly focussed relative to the displaced cell 20″. Since the prism 15 is fixed relative to the retrodirector 20, it too is shifted to a new position 15″. As a consequence, the emerging beam 35″, upon reflection from the second surface 17″, is restored to its original path.

FIG. 4 illustrates the second embodiment in which the location of the cell 25 on the receiving surface 23 of the retrodirector 20 is fixed. Now when the retrodirector 20 is rotated to a new position 50, to restore the focus it becomes necessary to displace the entire assembly horizontally a distance 51 and vertically a distance 52, restoring the beam to its desired path. I have found that for a very wide range of variation in the angle of incidence, for example, from 15°–75°, in the embodiment illustrated in FIG. 4, the total adjustments both vertically and horizontally do not exceed ¼″. It will further be obvious that suitable mechanisms can be provided which will couple the motions required so that, in the case of the embodiment illustrated in FIG. 1, a rotation of the retrodirector 20 will automatically translate the cell along the receiving surface 23 thereof and simultaneously translate the whole assembly the required amount to restore the focus. In the case of the embodiment illustrated in FIG. 4, the rotation of the retrodirector 20 will automatically displace the entire assembly the necessary distance vertically and horizontally to restore the focus.

FIG. 3 illustrates, in perspective view, an embodiment which combines the optics illustrated in FIGS. 1 and 4. The prism 15 and the retrodirector 20 are mounted on a common platform 60, in turn supported on a base 61 provided with micrometer adjustors 62 and 63 which enable the entire platform 60 to be translated vertically and horizontally the required distances. A knob 65 is coupled to the retrodirector 20 which provides for rotation of the latter.

The retrodirector 20 comprises a spindle 66, journalled at 67 on the platform 60, and supported for rotation at its opposite end by an arm 68 extending from a post 69 mounted on the platform 60. A scale 70 is associated with the retrodirector 20 to indicate the angle of incidence $\theta$. On the spindle 66 is mounted a support 71 for a mirror 72 corresponding to the second reflecting surface 34. A support extends at right angles to the mirror 72. On support 73 is mounted a cell holder comprising a grooved base 74 on which is arranged an inverted U-shaped support 75 with a hold-down block 76. Between the latter and the base 74 is arranged the cell 26. To the entrance surface of the cell is cemented the hemi-cylinder 29. By means of an adjustment screw (not shown) at the bottom of the base 74, the cell asembly 26, 29, 74, 75 can be displaced along the arm 73.

The prism 15 is shown mounted on an adjustable slide 78, which may be employed to initially fix the distance of the prism 15 from the spindle 66. Once adjusted, this spacing remains fixed during operation.

It will be appreciated that the member 20, while described as a retrodirector, differs from the conventional element of that name, which is a right-angle mirror. The use of the name is, however, justified by the fact that the entrance surface of the cell 25, shown in FIG. 4 at 80, lies in a plane 23 which extends at right angles to the plane 34 of the mirror reflector. Since the exiting light beam from the cell 25 has the same angle with respect to a normal to the plane 23 as the beam's angle of incidence $\theta_1$, for all practical purposes the member 20 can be considered to be the optical equivalent of a reflector lying in the plane 23. Similarly, if a single reflection cell were employed, it would be located in the position of the hemi-cylinder 29, with the substance to be analyzed deposited on the planar bottom surface in the plane 23. Also, with a single reflection cell, the retrodirector 20 and cell can be combined into a single unit, when constructed as a simple prism, with the hypotenuse extending adjacent and generally in the same direction as the hypotenuse of the prism 15 in FIG. 1, and with the two side surfaces having positions corresponding to the surfaces 23 and 34.

It will be clear from the foregoing that our improved variable angle attachment for internal reflection cells provides for wide ranges of variation of the angle of incidence with no displacement of the light beams at the entrance slit of the spectrometer and only negligible change in the optical path length, so that any defocussing of the source image at the entrance slit is negligible. The attachment is extremely versatile and can be used for either single or multiple internal reflection cells. The attachment can be employed with only minor modifications in existing instruments, and offers the operator the ability to vary the angle of incidence over a wide range controlling the depth of penetration into the sample permitting many different types of surface studies and also controlling the number of reflections.

Those skilled in the art will also recognize that variations in the device described are possible within the principles outlined. Thus, while the invention has been described in its preferred embodiments, it is understood that no limitation on the scope of the invention is intended, and that changes therein within the scope of the appended claims may be made without departing from the true scope and spirit of the invention in its broad aspects.

What is claimed is:

1. A device for varying the angle of incidence of a beam of radiation onto an internal reflection cell for use in a spectrometer, comprising a first member having first and second plane, reflecting surfaces intersecting at a right angle, said first reflecting surface being adapted to receive an incident beam of radiation from the spectrometer, and the second reflecting surface being adapted to redirect the beam back to the spectrometer, a retrodirector spaced from the first member, said retrodirector comprising a supporting member in the path of the beam reflected from the said first reflecting surface and a third reflecting surface, said retrodirector supporting member extending in a given plane, said third reflecting surface extending in a plane at right angles to the given plane, a double-pass multiple reflection cell comprising a generally plate-like member mounted on the supporting member of said retrodirector such that the plane of the generally plate-like member extends substantially perpendicular to the said given plane with the plate-like member extending away from the said first member and having a radiation beam receiving edge portion located generally in the said given plane, said multiple reflection cell containing a sampling surface from which the beam is to be reflected at an angle over a range including its critical angle, a common support for said first member and said retrodirector, means for rotating the retrodirector relative to the first member about an axis formed by the intersection of its two planes to vary the angle of incidence of the beam on the said sampling surface of the multiple reflection cell, and means for displacing the said common support for the first member and the retrodirector in at least one direction in the plane which includes the incident and redirected beams and substantially parallel to the incident beam.

2. The invention of claim 1 and including means for displacing the said common support in at least another direction perpendicular to said one direction and also in the plane which includes the incident and redirected beams.

3. The invention of claim 1 wherein the multiple reflection cell is movable along the said supporting member along said given plane.

4. The invention of claim 1 wherein a hemi-cylindrical radiation-transparent member is optically coupled to the receiving edge portion of the cell.

References Cited

UNITED STATES PATENTS 3,240,111   3/1966   Sherman et al. _____ 88—14

OTHER REFERENCES

Harrick: "Multiple Reflection Cells for Internal Reflection Spectrometry," Analytical Cemistry, vol. 36, No. 1, January 1964, pp. 188–191.

Hansen: "Variable Angle Reflection Attachment for the Ultraviolet, Visible, and Infrared," Analytical Chemistry, vol. 37, No. 9, August 1965, pp. 1142–1145.

JEWELL H. PEDERSEN, Primary Examiner

F. L. EVANS, Assistant Examiner

U.S. Cl. X.R.

250—83.3; 350—96